Feb. 22, 1938.  R. E. GEARHART ET AL  2,109,111
ELECTRICAL MOTOR
Filed June 15, 1936  2 Sheets-Sheet 1
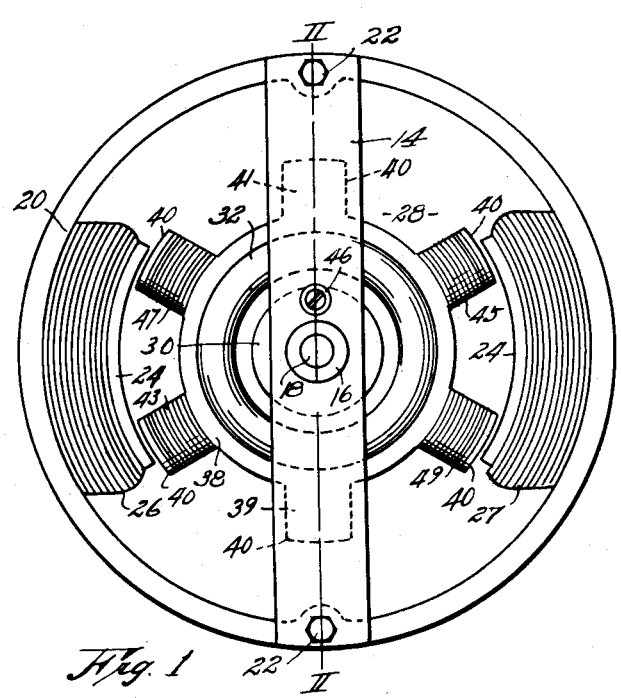
Fig. 1
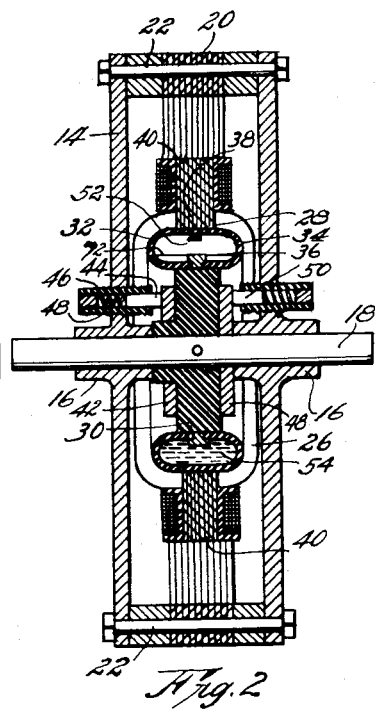
Fig. 2
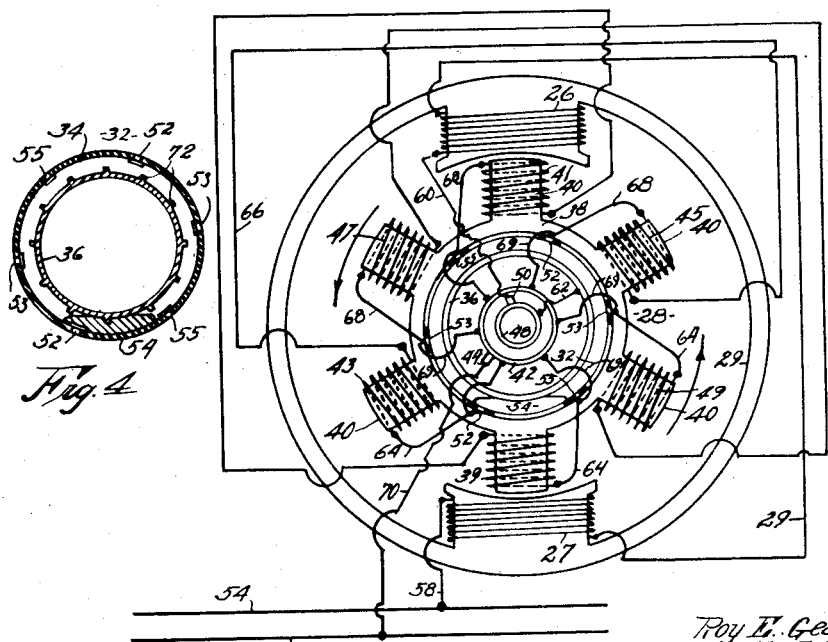
Fig. 3
Fig. 4
INVENTORS,
Roy E. Gearhart,
Everett L. Renshaw.
BY
Hovey & Hamilton,
ATTORNEYS.

Feb. 22, 1938.                R. E. GEARHART ET AL                2,109,111
                                 ELECTRICAL MOTOR
                              Filed June 15, 1936          2 Sheets-Sheet 2
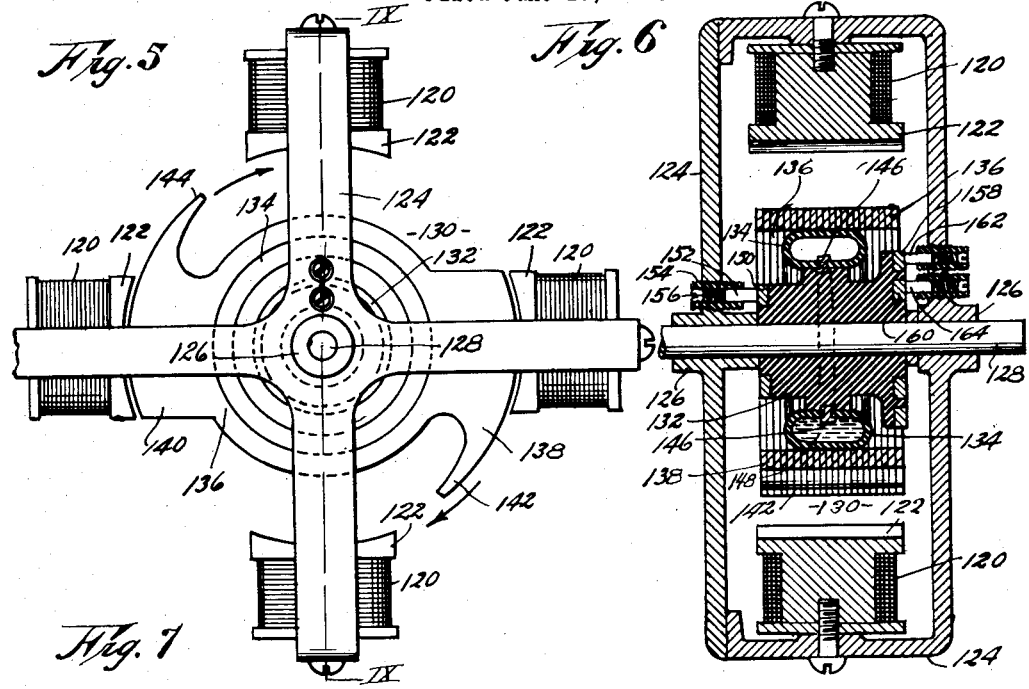
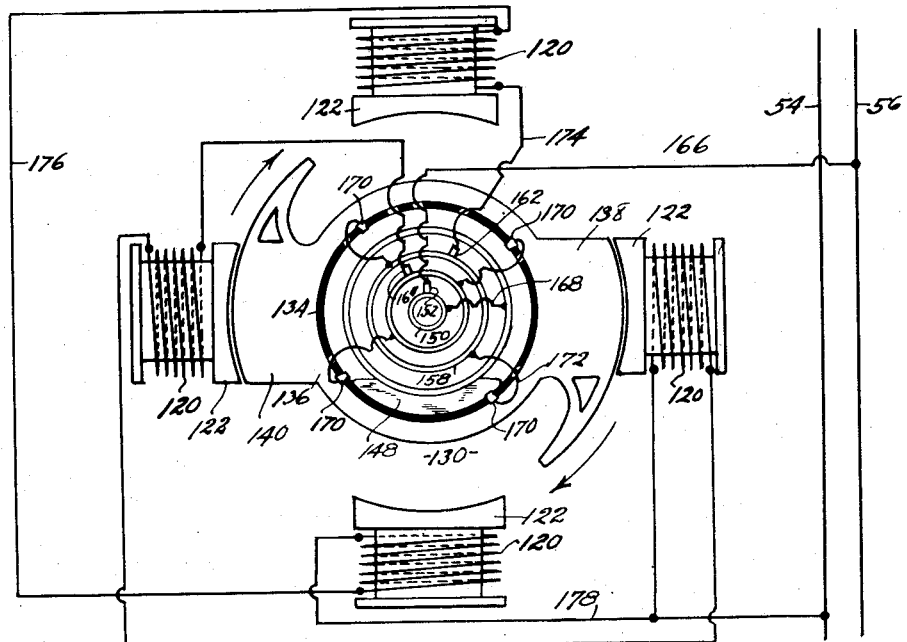
INVENTORS,
Roy E. Gearhart.
Everett L. Renshaw
BY
Havey & Hamilton,
ATTORNEYS.

Patented Feb. 22, 1938

2,109,111

UNITED STATES PATENT OFFICE 2,109,111

ELECTRICAL MOTOR

Roy E. Gearhart and Everett L. Renshaw, Chicago, Ill.

Application June 15, 1936, Serial No. 85,346

10 Claims. (Cl. 172—36)

This invention relates to electric motors and particularly to a low speed electric motor.

This invention is best suited for the smaller type of motor and especially the single phase type which is increasing in use rapidly because of its simplicity in construction and general utility.

The principal object of the present invention is the provision of a slow speed motor wherein a floating circuit closing device, controlling electric current to the motor, functions by centrifugal force to vary the time of circuit closing, whereby the speed of the motor may be maintained at a substantially predetermined uniform low rate.

Another object of this invention is the provision of an electric motor having a current control means comprising a switch member mounted in an annular compartment, in which spaced-apart contacts are mounted and adapted to remain in the bottom portion of the compartment as the same is rotated, whereby the electric current to the motor is controlled.

Still another object of the invention is the provision of a current control means for electric motors having a liquid electrical conductor member so mounted in a rotatably mounted compartment, having spaced-apart contact members as to successively connect said contact points as the compartment is rotated to control the flow of the electric current to said motor.

A further object of this invention is the provision of contact closing means for electric motors operable by centrifugal force, whereby the speed of the motor is governed.

With these and other objects which will appear throughout the specification in view, reference will now be had to the drawings, wherein:

Figure 1 is a side elevation of a motor embodying this invention.

Fig. 2 is a central, sectional view, taken on line II—II of Fig. 1.

Fig. 3 is a diagrammatical view of the electrical circuit.

Fig. 4 is a reduced sectional view of the annular compartment, with the liquid contact member in position.

Fig. 5 is a side elevation of a further modification wherein only the field poles are provided with windings.

Fig. 6 is a sectional view, taken on line IX—IX of Fig. 5, and,

Fig. 7 is a diagrammatical view of the circuit as used in the motor shown in Figs. 5 and 6.

Throughout the several views, like reference characters designate similar parts, and the numeral 14 indicates a motor frame, having bearings 16 in which is rotatably mounted an armature shaft 18. The laminated field frame 20 is carried by frame 14 and secured thereto by bolts 22. The diametrically opposed field poles 24 are provided with field windings 26 and 27, which are wound in opposite directions so as to produce unlike polarity in the opposite poles.

Rotor 28 consists of the central insulating frame 30, rigidly mounted for rotation with shaft 18, and adapted to receive the annular compartment 32 and maintain it in a position concentric with the motor shaft. The annular compartment consists of a body member 34 of insulating material, and is provided with a conductor ring 36, which extends into the compartment, around its inner wall. Mounted on compartment 32 is an armature core 38, having a series of radially disposed poles 40. Six poles, comprising three pairs, are shown, and it will be noted that they are equally spaced, thus producing three pairs of diametrically disposed cores. The cores of each set are provided with opposite windings 39, 41, 43, 45, 47, and 49 respectively, connected in series to cause unlike polarity of the poles.

Collecting ring 42 is mounted on frame 30, as clearly shown in Fig. 2, and is adapted to form contact with brush 44 mounted in the stationary frame 14. This brush is insulated from the frame by housing 46, and held in yielding contact with ring 42 by spring 48. Another collecting ring 48 is mounted on the rotor frame and is contacted by brush 50 which is carried by the stationary motor frame. The outer peripheral wall of compartment 32 is provided with spaced-apart contact points 52, 53 and 55, which extend into the compartment and are adapted to be contacted by a switch or contact member 54. The switch member is preferably a good conductor of high specific gravity which will tend to remain stationary in the bottom portion of compartment 32 as the same is rotated during the running of the motor. It has been found that mercury is adapted for use as a contact member; however, other liquids or solids might also be used. In order to prevent amalgamation of the mercury, compartment body 32 is made of an insulating, non-metallic material or a material that will not amalgamate with the mercury. Air is preferably removed from chamber 32 and with some types of switch member, a certain gas or gases might be injected into the compartment.

As clearly shown in Figs. 2, 3 and 4, a sufficient quantity of mercury is used to normally fill the lower portion of the compartment and contact the lower and top walls thereof enough to close the electric circuit between conductor ring 36 and contact points 52, 53 or 55 as the rotor is being moved about its axis.

Referring now to Fig. 3 which is a diagrammatical showing of the circuit, 54 and 56 are the line wires from a suitable electrical source. It is apparent that the position of the motor relative to a horizontal plane determines the position of the mercury relative to the contact points, and that by simply raising or lowering one side of the motor, the relation of the mercury to the contact points might be adjusted to any desired position. With the relation of the parts as shown in Fig. 3, the travel of the current is as follows: From line wire 54 the current passes through conductor 58 to field coil 27, thence through wire 29 to field coil 26, then to brush 58 by way of wire 60.

From brush 58 the current passes through ring 48, wire 62, to conductor ring 36. Ring 36 is in contact with the floating conductor 54 as is also one of the contact points 52. The current passes from 36 through 54, point 52 to conductor 64, then through armature coil 43, wire 66, armature coil 45, wire 68, contact point 52, wire 69, collector ring 42, brush 44 and to line wire 56 through conductor 70. When the parts are so positioned and energized, field coils 26 and 27 will be attracting the armature poles 43 and 45 to cause the movement of the rotor in the direction indicated by the arrows.

It will be observed that the contact point 55 is out of the mercury switch while pole 39 is centered with field pole 27. By so positioning the contact points and the poles, the motor will be self-starting, and when once started, the momentum of the rotor will smooth out the running speed.

Since the three sets of armature coils are identical in their wiring, like numerals are used on the similar wires and conductors. A further function of the mercury switch is to serve as a regulator for the speed of the rotor by varying the relation of the field and armature poles at the time of energizing the coils. This is accomplished by so constructing the annular compartment and supplying it with the liquid switch material, such as mercury, as to cause the mercury to make connection between the contact members when the poles of the rotor and field are in proper relation to cause the rotor to travel at a predetermined low speed. Should the rotor be speeded up to a rate greater than this predetermined speed, then the mercury due to centrifugal force will tend to follow the travel of the annular compartment, thus advancing the timing of the closing of said contact and decreasing the effective action between the fields and armature. This change in said timing will cause a reduction of power and a slowing down of the speed of the motor under a given load until the predetermined speed is attained, thereby regulating the motor speed. Since the principal object of this invention is to obtain a low speed motor regardless of efficiency, it is apparent that with proper adjustment of the relation of the parts, an extremely low speed may be obtained and maintained. In order to retard the relative movement between the mercury and the annular compartment, transverse ribs 72 are provided in the wall of the compartment. These restrictions of the compartment might be varied to control the flow of the mercury at any predetermined speed. Should the speed of the rotor be obtained sufficient to cause a spreading of the mercury over a large area of the outer wall of the compartment due to centrifugal force, it would be thinned out and would not contact the inner contact ring 36 to form a connection with the outer contact points.

The modified form of the motor shown in Figs. 5, 6 and 7 contemplates windings 120 for the four equally spaced field poles 122 which are mounted in the motor frame 124. This frame is provided with bearings 126, in which is mounted for rotation the motor shaft 128. Securely attached to shaft 128 is a rotor 130 which consists of an annular insulating block 132 that carries at its outer periphery, an annular compartment 134. Mounted on the outer periphery of compartment 134 is a laminated armature 136, having two oppositely disposed poles 138 and 140. Like sides of poles 138 and 140 are attenuated to form projections 142 and 144 which are disposed in the direction of travel of the rotor.

Extending through the inner wall of compartment 134 is an annular conductor 146 which normally contacts the mercury switch member 148. Carried by insulating block 132 is a collector ring 150 which is contacted by brush 152 carried by frame 124 and insulated therefrom by bushing 154. Brush 152 is maintained in operative relation with the ring by means of spring 156. Collector rings 158 and 160 are also provided and coact with brushes 162 and 164 respectively to carry current to the moving parts.

Referring now to Fig. 7 which is a diagrammatical view of the electrical circuit employed, 54 and 56 are line wires which are supplied with electrical current from any suitable source. The field windings 120 are positioned ninety degrees apart to form two sets of oppositely disposed propulsion means which operate successively and cause a rotation of the armature.

The current from line wire 56 passes through conductor 166 to brush 152, thence through ring 150, through wire 168, to the annular conductor 146, through mercury switch member 148, to contact member 170 which is positioned in the outer wall of compartment 134, thence through wire 172 to collector ring 158 where it enters brush 162, thence through conductor 174 to field winding 120 to wire 176 to the opposite field winding 120, thence through conductor 178 to line wire 54. This same general travel of the current will occur when the diametrically opposed contact member 170 is in contact with the mercury switch 148. Likewise, when the other two contact members 170 which control the flow of current to the other field coils are in contact with the mercury, then these other field coils will be energized to cause a rotation of the rotor.

When the rotor is in the position as shown in Fig. 7 with the horizontally disposed field coils de-energized and the vertically disposed coils energized, the attenuated poles will be so positioned as to cause a starting torque for the rotor. This simple type of electric motor with the mechanical structure and electrical hook-up shown may be operated at an extremely low rate of speed and the floating mercury contact member 148 will, through action of centrifugal force, maintain said motor at a constant uniform speed.

While we have shown two types of motors equipped with the floating switch that controls the current to the motor and also controls the speed of the motor, yet it is apparent that the invention is applicable to most of the present known types of motors without departing from the purposes of the invention. Reference has been made to special means whereby the flow of the liquid switch member might be retarded, thereby making it possible to further reduce the speed of the motor. These means might be such as to retard the flow of the mercury to an extent sufficient to obtain any desired low speed of the motor.

What we claim is:

1. In an electric motor, an armature, field members located about said armature, an annular compartment carried concentrically with said armature, a series of contact points extending within said compartment; and a gravity biased electric conductor member in said compartment adapted to remain in the lower portion of said annular compartment and co-operate with said contact points as the armature is rotated whereby current is successively delivered to said field members.

2. In an electric motor an armature, a field member, an annular compartment carried concentrically with said armature; contact members extending into said compartment; and a relatively heavy electric conductor member adapted to constantly maintain a position in the bottom portion of said compartment as the armature is rotated, and to co-operate with said contact members whereby the electric current to said motor is controlled.

3. In an electric motor, a rotor, a field member, an annular compartment mounted for rotation by said rotor; contact members within said compartment, and an electrical conductor positioned in said compartment and adapted to constantly remain in the bottom portion thereof and engage said contact members as the compartment is rotated, whereby the electric current to the motor is controlled.

4. In an electric motor, an armature, a field member located about said armature; an annular compartment carried concentrically with said armature; spaced-apart contact members extending into said compartment; a liquid electric conductor positioned in said compartment and adapted to remain in the bottom thereof as the compartment is rotated, whereby said contact members are successively interconnected to control the flow of electric current to said motor.

5. In an electric motor, an armature; a field member located about said armature; a vertically disposed annular compartment carried concentrically by said armature and rotatable therewith; an annular contact member in said compartment co-extensive with the inner wall thereof; a series of spaced-apart contact points extending through the outer wall of said compartment; and a liquid electrical conductor positioned in said compartment and adapted to remain in the bottom portion thereof as the compartment is rotated, whereby said annular contact member is successively connected with said contact points to control the flow of electrical current to the motor.

6. In an electric motor, an armature; a field member located about said armature; a vertically disposed annular compartment carried concentrically by said armature and rotatable therewith; a continuous annular conductor positioned in said compartment; a series of contact points in said compartment positioned at a different radius from the axes of rotation of said compartment than the radius of the annular conductor; a gravity actuated electrical conductor positioned in said compartment and adapted to remain in the bottom portion thereof as the compartment is rotated, and to successively connect said contact points with said annular conductor whereby the electric current to the motor is controlled.

7. In an electric motor, an armature; a field member located about said armature; a vertically disposed annular compartment carried concentrically by said armature and rotatable therewith; spaced-apart contact members within said compartment; a liquid, electrical conductor positioned in said compartment and adapted to remain in the bottom portion thereof as the compartment is rotated, and to successively interconnect certain of said contact members to control the electric current to said motor.

8. In an electric motor, an armature; a field member located about said armature; a vertically disposed annular compartment carried concentrically by said armature and rotatable therewith; spaced-apart contact members within said compartment; a liquid, electrical conductor positioned in said compartment and adapted to remain in the bottom portion thereof as the compartment is rotated, and to successively interconnect certain of said contact members to control the electric current to said motor, said liquid, electrical conductor being so positioned as to vary the time of interconnecting said contacts when a predetermined speed of rotation of said compartment is attained, whereby the speed of the motor is regulated.

9. In an electrical motor, a vertically disposed armature; a field member having windings associated with said armature; an annular compartment carried concentrically with said armature and rotatable therewith; spaced-apart contact members within said compartment; a liquid, electrical conductor positioned in the compartment and adapted, because of the force of gravity, to remain in the bottom portion thereof as the same is rotated, and to successively interconnect certain of said contact members to control the flow of electrical current to said field windings, said liquid conductor being adapted to so function, due to the speed of said compartment, as to vary the time of interconnecting said contact member, whereby the speed of the motor is held substantially constant.

10. In an electric motor, an armature; a field member located about said armature; a vertically disposed annular compartment carried concentrically by said armature and rotatable therewith; spaced-apart contact members within said compartment; a liquid, electrical conductor positioned in said compartment and adapted to remain in the bottom portion thereof as the compartment is rotated, and to successively interconnect certain of said contact members to control the electric current to said motor; and transverse projections extending inwardly from the walls of said annular compartment whereby the flow of said liquid in the compartment is retarded.

ROY E. GEARHART.
EVERETT L. RENSHAW.